(12) United States Patent
Wada et al.

(10) Patent No.: US 11,098,916 B2
(45) Date of Patent: Aug. 24, 2021

(54) AIR CONDITIONING SYSTEM

(71) Applicant: Mitsubishi Electric Corporation, Tokyo (JP)

(72) Inventors: Makoto Wada, Tokyo (JP); Takuya Matsuda, Tokyo (JP); Katsuhiro Ishimura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 16/498,005

(22) PCT Filed: May 24, 2017

(86) PCT No.: PCT/JP2017/019320
§ 371 (c)(1),
(2) Date: Sep. 26, 2019

(87) PCT Pub. No.: WO2018/216127
PCT Pub. Date: Nov. 29, 2018

(65) Prior Publication Data
US 2020/0318840 A1 Oct. 8, 2020

(51) Int. Cl.
*F24F 11/36* (2018.01)
*F24F 11/77* (2018.01)
(Continued)

(52) U.S. Cl.
CPC ............ *F24F 11/36* (2018.01); *F24F 11/52* (2018.01); *F24F 11/77* (2018.01); *F24F 11/84* (2018.01); *F24F 2110/65* (2018.01)

(58) Field of Classification Search
CPC .. F24F 11/36; F24F 11/77; F24F 11/84; F24F 11/52; F25B 2313/023
See application file for complete search history.

(56) References Cited

U.S. PATENT DOCUMENTS 6,073,455 A 6/2000 Tachigori et al.
2007/0156373 A1* 7/2007 Yamashita ............ F25B 49/005
702/182
(Continued)

FOREIGN PATENT DOCUMENTS

EP 1 083 392 A2 3/2001
EP 2 264 379 A1 12/2010
(Continued)

OTHER PUBLICATIONS

International Search Report of the International Searching Authority dated Jul. 25, 2017 for the corresponding international application No. PCT/JP2017/019320 (and English translation).

(Continued)

*Primary Examiner* — Nelson J Nieves
(74) *Attorney, Agent, or Firm* — Posz Law Group, PLC

(57) ABSTRACT

A storage device of a system control device stores grouping information that defines an association among a refrigerant sensor, a plurality of indoor units, at least one outdoor unit, and a plurality of refrigerant leakage suppression devices. When refrigerant leakage is detected by the refrigerant sensor, the system control device performs a process for specifying, from the plurality of indoor units, an indoor unit in which the refrigerant leakage has occurred. Further, the system control device makes reference to the grouping information to operate a refrigerant leakage suppression device corresponding to the indoor unit specified by performing the above-described process.

8 Claims, 9 Drawing Sheets

(51) Int. Cl.
*F24F 11/84* (2018.01)
*F24F 11/52* (2018.01)
*F24F 110/65* (2018.01)

(56) References Cited

U.S. PATENT DOCUMENTS

| | | | |
|---|---|---|---|
| 2009/0025406 A1* | 1/2009 | Yoshimi | F24F 11/83 62/127 |
| 2009/0107157 A1* | 4/2009 | Dube | F25B 49/005 62/149 |
| 2011/0000240 A1 | 1/2011 | Yamada et al. | |
| 2012/0272672 A1* | 11/2012 | Morimoto | F25B 41/20 62/126 |
| 2013/0098576 A1* | 4/2013 | Fujitaka | F24F 1/0007 165/11.1 |
| 2013/0192283 A1* | 8/2013 | Yamashita | F25B 49/005 62/126 |
| 2014/0033754 A1* | 2/2014 | Hatomura | F25B 13/00 62/190 |
| 2015/0159931 A1* | 6/2015 | Okada | F24F 11/30 62/126 |
| 2015/0233622 A1* | 8/2015 | Yajima | F25B 49/005 62/129 |
| 2016/0003561 A1* | 1/2016 | Casper | F28F 13/06 165/201 |
| 2016/0356534 A1* | 12/2016 | Hatada | F25B 49/02 |
| 2018/0045424 A1* | 2/2018 | Yajima | F24F 11/30 |
| 2018/0283718 A1* | 10/2018 | Honda | F24F 11/77 |
| 2018/0283719 A1* | 10/2018 | Honda | F25B 49/02 |
| 2018/0283725 A1* | 10/2018 | Ikawa | F24F 11/89 |
| 2019/0017718 A1* | 1/2019 | Suzuki | F25B 13/00 |
| 2019/0331377 A1* | 10/2019 | Matsuda | F25B 49/02 |
| 2019/0383509 A1* | 12/2019 | Takagi | F25B 1/00 |
| 2019/0383511 A1* | 12/2019 | Tomita | F24F 11/38 |
| 2019/0390876 A1* | 12/2019 | Matsuda | F25B 49/02 |

FOREIGN PATENT DOCUMENTS

| | | | | |
|---|---|---|---|---|
| EP | 3 358 278 A1 | | 8/2018 | |
| JP | 08178397 A | * | 7/1996 | F24F 11/36 |
| JP | 09324928 A | * | 12/1997 | F24F 11/36 |
| JP | H11-230648 A | | 8/1999 | |
| JP | 2000006801 A | * | 1/2000 | |
| JP | 2006023072 A | * | 1/2006 | F24F 11/36 |
| JP | 2009-229050 A | | 10/2009 | |
| JP | 2013-122364 A | | 6/2013 | |
| JP | 2016-011781 A | | 1/2016 | |
| JP | 2016188758 A | * | 11/2016 | F24F 11/30 |
| JP | 2016-211826 A | | 12/2016 | |
| JP | 2016-223643 A | | 12/2016 | |
| JP | 2016205769 A | * | 12/2016 | F24F 11/65 |
| JP | 2017036890 A | * | 2/2017 | |
| JP | 2017-048993 A | | 3/2017 | |
| JP | 2017048993 A | * | 3/2017 | F24F 11/77 |
| JP | 2017-067428 A | | 4/2017 | |
| JP | 2017067428 A | * | 4/2017 | F24F 11/89 |
| JP | 2018115781 A | * | 7/2018 | F24F 1/32 |
| WO | WO-2017163321 A1 | * | 9/2017 | F25B 49/005 |

OTHER PUBLICATIONS

Office Action dated Nov. 4, 2020 issued in corresponding JP Patent Application No. 2019-519866 (and English translation).
Extended European Search Report dated Apr. 23, 2020 issued in corresponding EP patent application No. 17911003.6.
Office Action dated Jul. 21, 2020 in corresponding Japanese Patent Application No. 2019-519866 (and English translation).
Office Action dated Feb. 16, 2021 issued in corresponding JP Patent Application No. 2019-519866 (and English translation).

* cited by examiner

| TARGET SPACE | OUTDOOR UNIT | INDOOR UNIT | REFRIGERANT SENSOR | REFRIGERANT LEAKAGE SUPPRESSION MEANS |
|---|---|---|---|---|
| 1(40) | 1(10a) | 1(20a) | 1(50) | REFRIGERANT CIRCUIT SHUTOFF |
| | 2(10b) | 2(20b) | 1(50) | REFRIGERANT CIRCUIT SHUTOFF |

| TARGET SPACE | OUTDOOR UNIT | INDOOR UNIT | REFRIGERANT SENSOR | REFRIGERANT LEAKAGE SUPPRESSION MEANS |
|---|---|---|---|---|
| 1(40) | 1(10#a) | 1(20a) | 1(50) | REFRIGERANT COLLECTION (PUMP DOWN) |
| | 2(10#b) | 2(20b) | 1(50) | REFRIGERANT COLLECTION (PUMP DOWN) |

| TARGET SPACE | OUTDOOR UNIT | INDOOR UNIT | REFRIGERANT SENSOR | REFRIGERANT LEAKAGE SUPPRESSION MEANS |
|---|---|---|---|---|
| 1(40a) | 1(10a) | 1(20a) | 1(50a) | REFRIGERANT CIRCUIT SHUTOFF |
| | 2(10#b) | 2(20b) | 1(50a) | REFRIGERANT CIRCUIT SHUTOFF |
| 2(40b) | 2(10#b) | 3(20c) | 2(50b) | REFRIGERANT COLLECTION (PUMP DOWN) |

AIR CONDITIONING SYSTEM

CROSS REFERENCE TO RELATED APPLICATION

This application is a U.S. national stage application of PCT/JP2017/019320 filed on May 24, 2017, the contents of which are incorporated herein by reference.

TECHNICAL FIELD

The present disclosure relates to an air conditioning system, particularly, an air conditioning system in which an air conditioning apparatus is controlled in accordance with a detection result of a refrigerant leakage detector installed in an air conditioning target space.

BACKGROUND ART

Japanese Patent Laying-Open No. 2016-211826 (Patent Literature 1) discloses an air conditioning ventilation system excellent in safety against refrigerant leakage from an air conditioning apparatus. This air conditioning ventilation system includes an air conditioning apparatus, a ventilator, a controller, and a refrigerant leakage sensor. The air conditioning apparatus circulates refrigerant to perform cooling or heating of a target space. The ventilator is installed in the target space to forcedly ventilate the target space. The controller controls an operation of the air conditioning apparatus. The refrigerant leakage sensor detects refrigerant leakage in the target space. The controller prohibits the operation of the air conditioning apparatus when the ventilator is not operated normally or when communication with the ventilator is abnormal. Moreover, when refrigerant leakage is detected by the refrigerant leakage sensor, the controller makes the air conditioning apparatus nonoperational (see Patent Literature 1).

Meanwhile, in a building or the like, a plurality of indoor units may be installed in one target space and some indoor units may be connected to the same outdoor unit. Under such an installation environment, if all the indoor units installed in the target space are made nonoperational in response to detecting refrigerant leakage by a refrigerant leakage sensor, an indoor unit that could have otherwise continued its operation is also made nonoperational, with the result that indoor comfortableness is compromised.

Japanese Patent Laying-Open No. 2016-11781 (Patent Literature 2) discloses an air conditioning system that can handle the above problem. This air conditioning system includes a simultaneous cooling and heating type air conditioning apparatus in which a plurality of indoor units, a cooling/heating switching unit, and an outdoor unit are connected through three refrigerant communication pipes. In this air conditioning system, respective refrigerant sensors are provided for the indoor units to detect refrigerant leakage. When one of the refrigerant sensors detects refrigerant leakage, only an indoor unit corresponding to the refrigerant sensor having detected the refrigerant leakage is shut off from the refrigerant circuit during an air conditioning operation by way of various types of valve operations, whereby the other indoor units continue their operations while collecting the refrigerant of the indoor unit to a corresponding outdoor unit (see Patent Literature 2).

CITATION LIST

Patent Literature

PTL 1: Japanese Patent Laying-Open No. 2016-211826
PTL 2: Japanese Patent Laying-Open No. 2016-11781

SUMMARY OF INVENTION

Technical Problem

The air conditioning system described in Patent Literature 2 is a system having a refrigerant circuit configuration allowing for simultaneous cooling and heating. With such a refrigerant circuit configuration, the refrigerant of the indoor unit in which the refrigerant leakage has been detected can be collected to the outdoor unit while continuing the operations of the other indoor units. Moreover, in this air conditioning system, the respective refrigerant sensors are provided for the indoor units. Hence, unless one indoor unit corresponds to one refrigerant sensor, an indoor unit in which refrigerant leakage has been occurred cannot be specified. For actual air conditioning systems, cooling/heating switching type air conditioning systems are general. Moreover, a configuration in which a refrigerant sensor is not provided for each indoor unit (a configuration in which a refrigerant sensor is installed for each target space) may be also employed.

Thus, an object of the present disclosure is to provide an air conditioning system to improve safety with a simple configuration upon occurrence of refrigerant leakage in a target space while maintaining comfortableness in the target space.

Solution to Problem

An air conditioning system according to the present disclosure includes an air conditioning apparatus, a refrigerant leakage detector, and a plurality of refrigerant leakage suppression devices. The air conditioning apparatus is configured to perform cooling or heating of a target space by circulating refrigerant. The refrigerant leakage detector is installed in the target space, and is configured to detect refrigerant leakage from the air conditioning apparatus to the target space. The air conditioning apparatus includes a plurality of indoor units and at least one outdoor unit. The plurality of respective refrigerant leakage suppression devices are provided corresponding to the plurality of indoor units, and each of the plurality of refrigerant leakage suppression devices is configured to suppress the refrigerant leakage from an corresponding indoor unit when the refrigerant leakage from the corresponding indoor unit is specified. When the refrigerant leakage is detected by the refrigerant leakage detector, a refrigerant leakage suppression device included in the plurality of refrigerant leakage suppression devices and provided corresponding to an indoor unit specified by performing a process for specifying an indoor unit in which the refrigerant leakage has occurred is operated.

Advantageous Effects of Invention

In the air conditioning system of the present disclosure, the air conditioning apparatus is a so-called cooling/heating switching type air conditioning apparatus configured to perform cooling or heating of a target space by circulating refrigerant. When refrigerant leakage is detected by the refrigerant leakage detector installed in the target space, a refrigerant leakage suppression device included in the plurality of refrigerant leakage suppression devices and provided corresponding to an indoor unit specified by performing a process for specifying an indoor unit in which the refrigerant leakage has occurred is operated. Accordingly, the following measure or the like can be taken: an operation of each indoor unit for which a corresponding refrigerant leakage suppression device has not been operated is continued. Thus, according to the air conditioning system, upon occurrence of refrigerant leakage in a target space, safety can be improved with a simple configuration while maintaining comfortableness in the target space.

DESCRIPTION OF EMBODIMENTS

Figure 1:
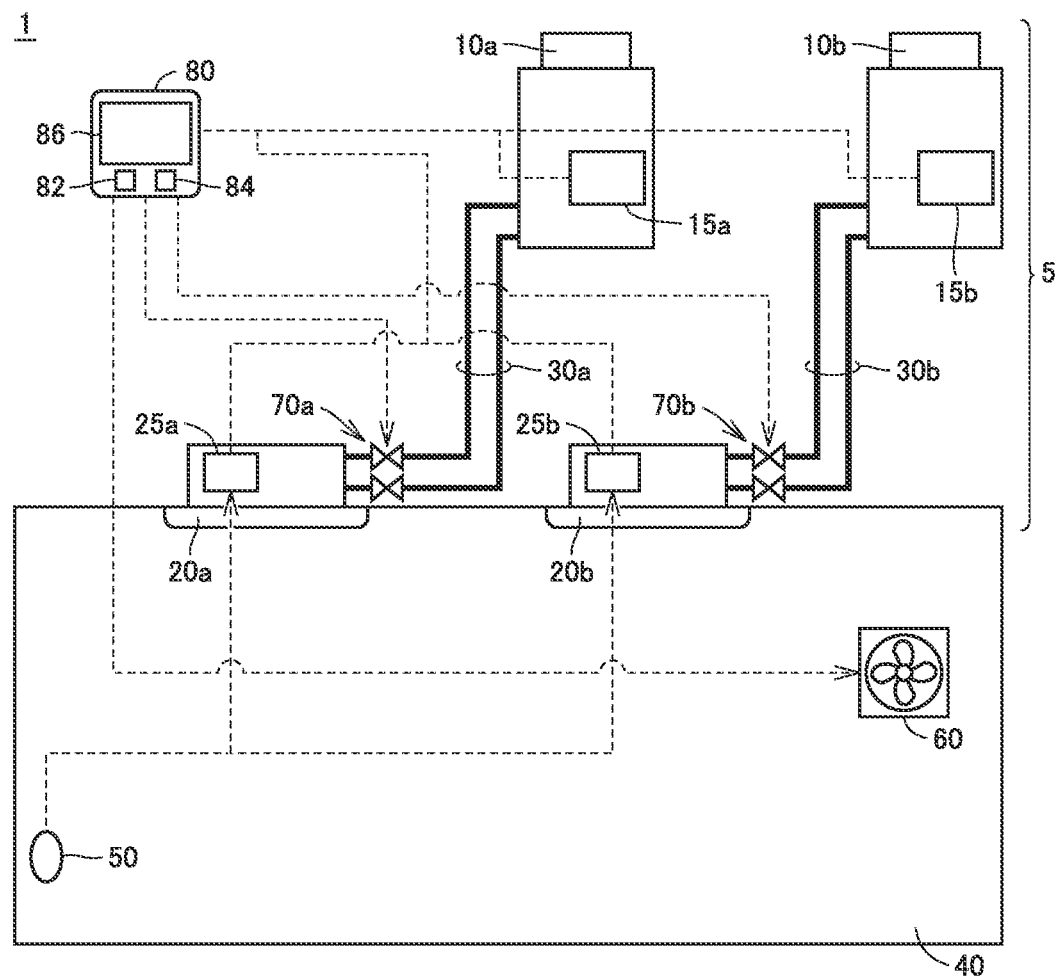
FIG. 1 is an entire configuration diagram of an air conditioning system according to a first embodiment of the present disclosure.

The following describes an embodiment of the present disclosure in detail with reference to figures. In the description below, a plurality of embodiments will be described; however, it is initially expected at the time of filing of the present application to appropriately combine configurations described in the embodiments. It should be noted that the same or corresponding portions in the figures are given the same reference characters and are not described repeatedly.

First Embodiment

<Entire Configuration of Air Conditioning System>

FIG. 1 is an entire configuration diagram of an air conditioning system according to a first embodiment of the present disclosure. With reference to FIG. 1, air conditioning system 1 includes: an air conditioning apparatus 5 configured to perform cooling or heating of a target space 40; a refrigerant sensor 50 and a ventilator 60 each installed in target space 40; and a system control device 80.

Air conditioning apparatus 5 includes outdoor units 10a, 10b, indoor units 20a, 20b, refrigerant pipes 30a, 30b, and shutoff valves 70a, 70b. Indoor unit 20a is connected to outdoor unit 10a through refrigerant pipe 30a, and a refrigeration cycle apparatus is constituted of outdoor unit 10a, indoor unit 20a, and refrigerant pipe 30a. Indoor unit 20b is connected to outdoor unit 10b through refrigerant pipe 30b, and a refrigeration cycle apparatus is constituted of outdoor unit 10b, indoor unit 20b, and refrigerant pipe 30b.

Shutoff valve 70a is provided at refrigerant pipe 30a, and is a valve configured to shut off a flow of the refrigerant flowing from outdoor unit 10a to indoor unit 20a or a flow of the refrigerant flowing from indoor unit 20a to outdoor unit 10a. Shutoff valve 70b is provided at refrigerant pipe 30b, and is a valve configured to shut off a flow of the refrigerant flowing from outdoor unit 10b to indoor unit 20b or a flow of the refrigerant flowing from indoor unit 20b to outdoor unit 10b.

Outdoor units 10a, 10b include: below-described various types of devices such as compressors and four-way valves; and respective controllers 15a, 15b configured to control the various devices. Each of controllers 15a, 15b includes a microcomputer, a memory, an input/output buffer, and the like (all not shown). In accordance with a control command from system control device 80, controller 15a controls operations of the various types of devices, such as the compressor and the four-way valve, each of which is provided in outdoor unit 10a. In accordance with a control command from system control device 80, controller 15b controls operations of the various types of devices, each of which is provided in outdoor unit 10b.

Indoor units 20a, 20b include: various types of devices such as below-described expansion valves; and respective controllers 25a, 25b configured to control the various devices. Each of controllers 25a and 25b also includes a microcomputer, a memory, an input/output buffer, and the like (all not shown). In accordance with a control command from system control device 80, controller 25a controls operations of the various types of devices, such as the expansion valve, each of which is provided in indoor unit 20a. In accordance with a control command from system control device 80, controller 25b controls operations of the various types of devices, each of which is provided in indoor unit 20b.

Figures 2, 3:
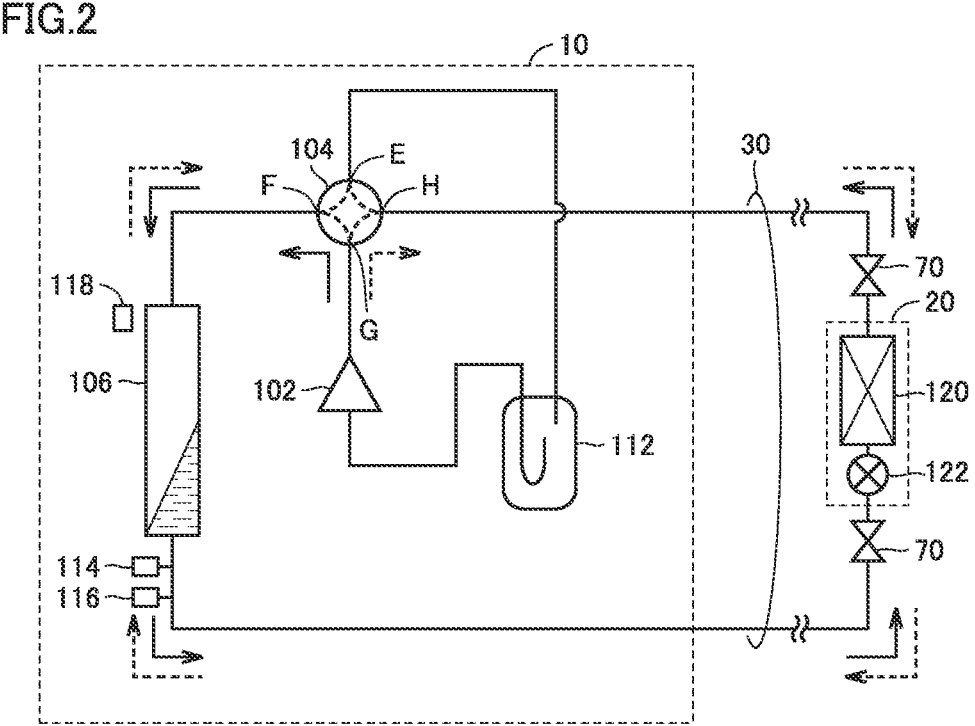
FIG. 2 shows a detailed configuration of a refrigeration cycle apparatus constituted of outdoor units, indoor units, and refrigerant pipes, which are shown in FIG. 1.
FIG. 3 shows exemplary grouping information for the air conditioning system shown in FIG. 1.

FIG. 2 shows a detailed configuration of the refrigeration cycle apparatus constituted of outdoor unit 10a (10b), indoor unit 20a (20b), and refrigerant pipe 30a (30b), which are shown in FIG. 1. The configuration of the refrigeration cycle apparatus constituted of outdoor unit 10b, indoor unit 20b, and refrigerant pipe 30b is the same as the refrigeration cycle apparatus constituted of outdoor unit 10a, indoor unit 20a, and refrigerant pipe 30a. In the description below, outdoor units 10a, 10b may be referred to as "outdoor unit 10" without distinguishing them from each other. Similarly, indoor units 20a, 20b may be referred to as "indoor unit 20" without distinguishing them from each other, and refrigerant pipes 30a, 30b may be referred to as "refrigerant pipe 30" without distinguishing them from each other. Moreover, shutoff valves 70a, 70b may be also referred to as "shutoff valve 70" without distinguishing them from each other.

With reference to FIG. 2, outdoor unit 10 includes a compressor 102, a four-way valve 104, an outdoor heat exchanger 106, and an accumulator 112. Indoor unit 20 includes an indoor heat exchanger 120 and an expansion valve 122. It should be noted that controller 15a (15b) and controller 25a (25b) shown in FIG. 1 are not shown in FIG. 2.

Compressor 102 compresses the refrigerant received from accumulator 112, and discharges the refrigerant to four-way valve 104. Compressor 102 is configured to change its operation frequency in accordance with a control command from the controller not shown in the figure. By changing the operation frequency of compressor 102, the output of compressor 102 is adjusted. For compressor 102, various types of compressors can be employed, such as a rotary type compressor, a reciprocating type compressor, a scroll type compressor, and a screw type compressor.

In accordance with a control command from the controller not shown in the figure, four-way valve 104 is switched to one of a state A (cooling operation state) and a state B (heating operation state). In state A, port E communicates with port H and port F communicates with port G. In state B, port E communicates with port F and port H communicates with port G.

Outdoor heat exchanger 106 is configured to allow the refrigerant to exchange heat with outdoor air (air outside target space 40 (FIG. 1)). In state A (cooling operation state), outdoor heat exchanger 106 functions as a condenser for liquefying the refrigerant by heat radiation in outdoor heat exchanger 106, whereas in state B (heating operation state), outdoor heat exchanger 106 functions as an evaporator for vaporizing the refrigerant by heat absorption in outdoor heat exchanger 106.

Indoor heat exchanger 120 is configured to allow the refrigerant to exchange heat with indoor air (air inside target space 40). In state A (cooling operation state), indoor heat exchanger 120 functions as an evaporator for vaporizing the refrigerant by heat absorption in indoor heat exchanger 120, whereas in state B (heating operation state), indoor heat exchanger 120 functions as a condenser for liquefying the refrigerant by heat radiation in indoor heat exchanger 120.

In accordance with a control command from the controller not shown in the figure, expansion valve 122 is adjusted in a degree of opening of the valve to achieve one of a full open state, SH (superheating: degree of superheating) control, SC (subcooling: degree of supercooling) control, and a close state.

It should be noted that shutoff valve 70 provided at refrigerant pipe 30 will be described later. Moreover, outdoor unit 10 further includes a pressure sensor 114 and temperature sensors 116, 118. Pressure sensor 114 and temperature sensors 116, 118 will also be described later.

In the refrigeration cycle apparatus having the above configuration, by operating compressor 102 in state A (cooling operation state), a refrigerant circulation path is formed in a direction indicated by solid line arrows in FIG. 2. Specifically, the refrigerant having been brought into a high-temperature high-pressure vapor state by compressor 102 is supplied to outdoor heat exchanger 106 via four-way valve 104, exchanges heat (heat radiation) with outdoor air in outdoor heat exchanger 106, and is accordingly condensed (liquefied) to be high-pressure liquid refrigerant.

Then, the refrigerant is decompressed by expansion valve 122, is supplied to indoor heat exchanger 120, exchanges heat (heat absorption) with indoor air in indoor heat exchanger 120, and is accordingly evaporated (vaporized) to be low-pressure gas refrigerant. Further, the refrigerant is supplied to accumulator 112 via four-way valve 104 and is suctioned to compressor 102 again. In this way, target space 40 (FIG. 1) having indoor unit 20 installed therein is cooled.

On the other hand, by operating compressor 102 in state B (heating operation state), a refrigerant circulation path is formed in a direction indicated by broken line arrows in the figure. Specifically, the refrigerant having been brought into a high-temperature high-pressure vapor state by compressor 102 is supplied to indoor heat exchanger 120 via four-way valve 104, exchanges heat (heat radiation) with indoor air in indoor heat exchanger 120, and is accordingly condensed (liquefied) to be high-pressure liquid refrigerant.

Then, the refrigerant is decompressed by expansion valve 122, is supplied to outdoor heat exchanger 106, exchanges heat (heat absorption) with outdoor air in outdoor heat exchanger 106, and is accordingly evaporated (vaporized) to be low-pressure gas refrigerant. Further, the refrigerant is supplied to accumulator 112 via four-way valve 104 and is suctioned to compressor 102 again. In this way, target space 40 having indoor unit 20 installed therein is heated.

As such, this refrigeration cycle apparatus (air conditioning apparatus 5) is of a cooling/heating switching type, i.e., is capable of switching between state A (cooling operation state) and state B (heating operation state) using four-way valve 104.

With reference to FIG. 1 again, refrigerant sensor 50 is installed in target space 40, and is configured to detect the refrigerant gas concentration of the refrigerant used in air conditioning apparatus 5, in atmospheric air. Alternatively, refrigerant sensor 50 can be configured to detect oxygen concentration so as to detect a decrease in oxygen concentration caused by an increase in refrigerant gas concentration. Refrigerant sensor 50 may be disposed in target space 40, or can be disposed in a duct (not shown) or in each of indoor units 20a, 20b, or the like.

Ventilator 60 is installed in target space 40 and is configured to forcedly ventilate target space 40. As an example, ventilator 60, which is constituted of a ventilation fan and an air inlet and/or an air outlet, forcedly ventilates target space 40 via the air inlet and/or the air outlet by the ventilation fan being operated in accordance with a control command from system control device 80.

Shutoff valves 70a, 70b are respectively provided at refrigerant pipes 30a, 30b, and are opened and closed in accordance with control commands from system control device 80. For example, each of shutoff valves 70a, 70b can be constituted of an electromagnetic valve, which is controlled to be opened and closed by supplying power/stop supplying power to an exciting circuit in accordance with a control command from system control device 80. It should be noted that in the case where the electromagnetic valve used herein is of a type that is opened when supplied with power and that is closed when not supplied with power, each of shut-off valves 70a, 70b can be brought into the close state to shut off the refrigerant in response to stopping the supply of power.

System control device 80 includes a CPU (Central Control Unit) 82, a storage device 84, a display device 86, an input/output buffer (not shown), and the like. System control device 80 generates control commands for controlling the operations of the various types of devices of outdoor unit 10a and the various types of devices of indoor unit 20a, and sends them to controller 15a of outdoor unit 10a and controller 25a of indoor unit 20a. Moreover, system control device 80 generates control commands for controlling the operations of the various types of devices of outdoor unit 10b and the various types of devices of indoor unit 20b, and sends them to controller 15b of outdoor unit 10b and controller 25b of indoor unit 20b.

Moreover, system control device 80 obtains an output signal from refrigerant sensor 50 via controller 25a of indoor unit 20a and/or controller 25b of indoor unit 20b. When refrigerant leakage in target space 40 is detected by refrigerant sensor 50, system control device 80 outputs an operation command to ventilator 60. Further, when refrigerant leakage is detected by refrigerant sensor 50, system control device 80 performs a process for specifying in which one of indoor units 20a, 20b installed in target space 40 the refrigerant leakage has occurred, and takes a measure on the indoor unit in which the refrigerant leakage has been specified, so as to suppress the refrigerant leakage. The following detailedly describes an operation when the refrigerant leakage is detected by refrigerant sensor 50.

<Control Operation Upon Detection of Refrigerant Leakage>

In air conditioning system 1 according to the first embodiment, respective refrigerant sensors 50 are not provided for indoor units 20a, 20b. Rather, one refrigerant sensor 50 is provided in target space 40 so as to detect the refrigerant leaked into target space 40. Therefore, in this air conditioning system 1, even when the refrigerant leakage is detected by refrigerant sensor 50, it cannot be determined in which one of indoor units 20a, 20b the refrigerant leakage has occurred. In this case, if the whole of air conditioning apparatus 5 including both indoor units 20a, 20b is made nonoperational, an indoor unit that could have otherwise continued its operation is also made nonoperational, with the result that comfortableness in target space 40 is compromised.

To address this, in air conditioning system 1 according to the first embodiment, when refrigerant leakage is detected by refrigerant sensor 50 installed in target space 40, a process is performed for specifying, from indoor units 20a, 20b installed in target space 40, an indoor unit in which the refrigerant leakage has occurred. Further, in this air conditioning system 1, a refrigerant leakage suppression device corresponding to the indoor unit in which the refrigerant leakage has been specified is operated by making reference to grouping information.

In this air conditioning system 1, shutoff valve 70a is provided as a refrigerant leakage suppression device corresponding to indoor unit 20a, and shutoff valve 70b is provided as a refrigerant leakage suppression device corresponding to indoor unit 20b. The grouping information is information that defines an association among refrigerant sensor 50, indoor units 20a, 20b, outdoor units 10a, 10b, and the plurality of refrigerant leakage suppression devices (shutoff valves 70a, 70b). The grouping information is prepared in advance in accordance with the configuration of air conditioning apparatus 5, and is stored in storage device 84.

With such a configuration, when refrigerant leakage is detected by refrigerant sensor 50 and the refrigerant leakage is specified to originate from, for example, indoor unit 20a, the following measure or the like can be taken: by making reference to the grouping information, shutoff valve 70a serving as the refrigerant leakage suppression device corresponding to indoor unit 20a is closed and the operation of indoor unit 20b is continued. As such, according to this air conditioning system 1, when refrigerant leakage occurs in target space 40, safety can be improved while maintaining comfortableness in target space 40.

FIG. 3 shows exemplary grouping information for air conditioning system 1 shown in FIG. 1. With reference to FIG. 3, one target space is provided in this first embodiment, and a target space 1 corresponding to target space 40 shown in FIG. 1 exists. Target space 1 is associated with a refrigerant sensor 1 corresponding to refrigerant sensor 50 shown in FIG. 1. Moreover, in this first embodiment, two indoor units 20a, 20b are installed in target space 40. Target space 1 and refrigerant sensor 1 are associated with indoor units 1, 2 respectively corresponding to indoor units 20a, 20b shown in FIG. 1.

Moreover, in this first embodiment, outdoor units 10a, 10b are respectively provided corresponding to indoor units 20a, 20b. Indoor units 1, 2 are associated with outdoor units 1, 2 respectively corresponding to outdoor units 10a, 10b shown in FIG. 1. Further, as refrigerant leakage suppression means corresponding to indoor unit 1, refrigerant circuit shutoff by shutoff valve 70a is associated. As refrigerant leakage suppression means corresponding to indoor unit 2, refrigerant circuit shutoff by shutoff valve 70b is associated.

The following describes an exemplary operation when refrigerant leakage is detected by refrigerant sensor 50. With reference to FIG. 3 and FIG. 1, when refrigerant leakage in target space 40 is detected by refrigerant sensor 50, system control device 80 makes reference to the grouping information stored in storage device 84, recognizes occurrence of the refrigerant leakage in target space 1 (target space 40), and makes reference to configurations of the outdoor and indoor units for target space 1.

By making reference to the grouping information, system control device 80 recognizes that the refrigerant circuit constituted of outdoor unit 1 and indoor unit 1 and the refrigerant circuit constituted of outdoor unit 2 and indoor unit 2 exist for target space 1, and determines that these two refrigerant circuits are to be examined in terms of refrigerant leakage (are to be specified as to whether or not refrigerant leakage has occurred) (a method for specifying a refrigerant circuit (indoor unit) in which refrigerant leakage has occurred will be described later).

When the refrigerant leakage is specified in the refrigerant circuit constituted of outdoor unit 1 and indoor unit 1, system control device 80 makes reference to the grouping information to recognize that the refrigerant circuit shutoff by shutoff valve 70a is prepared as the refrigerant leakage suppression means for the refrigerant circuit, and performs the refrigerant circuit shutoff by shutoff valve 70a. On the other hand, when the refrigerant leakage is specified in the refrigerant circuit constituted of outdoor unit 2 and indoor unit 2, system control device 80 makes reference to the grouping information to recognize that the refrigerant circuit shutoff by shutoff valve 70b is prepared as the refrigerant leakage suppression means for the refrigerant circuit, and performs the refrigerant circuit shutoff by shutoff valve 70b.

It should be noted that in this first embodiment, ventilator 60 is installed in target space 40 having refrigerant sensor 50 installed therein. When refrigerant leakage is detected by refrigerant sensor 50, system control device 80 performs the above-described process for specifying the refrigerant circuit in which the refrigerant leakage has occurred, and immediately operates ventilator 60.

Figure 4:
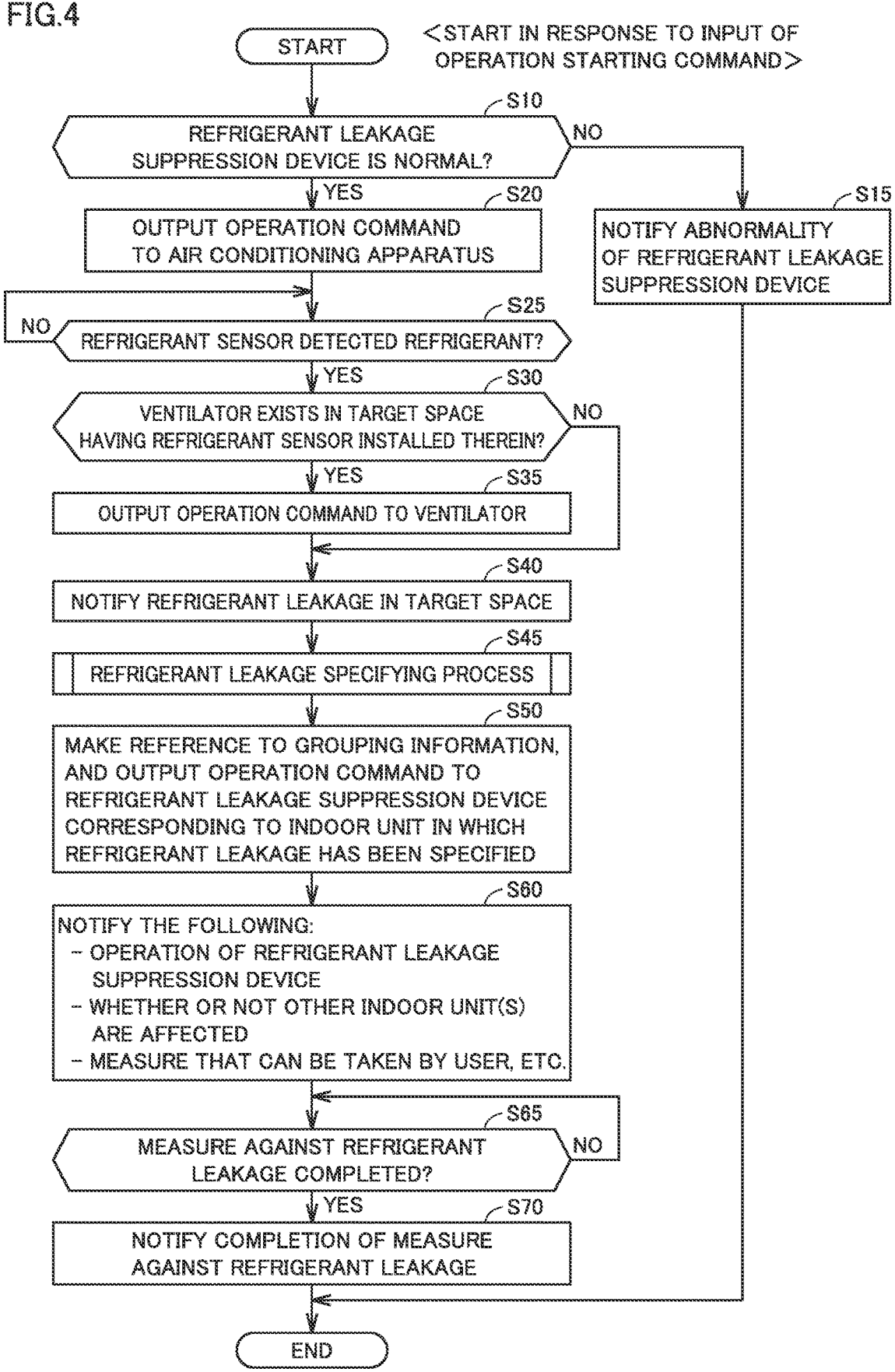
FIG. 4 is a flowchart illustrating a procedure of a process performed by a system control device.

FIG. 4 is a flowchart illustrating a procedure of the process performed by system control device 80. With reference to FIG. 4, a series of processes shown in this flowchart are started in response to input of a command for instructing start of the operation of air conditioning apparatus 5 (for example, input of an air conditioning starting command by a user).

System control device 80 determines whether or not each of the refrigerant leakage suppression devices is normal (step S10). In this first embodiment, it is determined whether or not each of shutoff valves 70a, 70b is operated normally.

For example, when an abnormality in communication with a refrigerant leakage suppression device is detected, system control device 80 determines that shutoff valve 70a or 70b is not normal (abnormal)

When a certain abnormality is detected in a refrigerant leakage suppression device (shutoff valve 70a or 70b) (NO in step S10), system control device 80 performs a process for notifying the abnormality of the refrigerant leakage suppression device (step S15) without outputting an operation command to air conditioning apparatus 5. As an example, system control device 80 controls display device 86 to display that the refrigerant leakage suppression device is abnormal. It should be noted that in addition to or instead of displaying that the refrigerant leakage suppression device is abnormal, an audio output may be provided to indicate that the refrigerant leakage suppression device is abnormal. Then, system control device 80 proceeds the process to END and the operation of air conditioning apparatus 5 is therefore not started.

When it is determined in step S10 that each of the refrigerant leakage suppression devices is normal (YES in step S10), system control device 80 outputs operation commands to air conditioning apparatus 5 (step S20). Specifically, based on selection of cooling/heating, setting temperature and detection temperature of target space 40, and the like, operation commands for operating outdoor unit 10a and indoor unit 20a are output to controller 15a of outdoor unit 10a and controller 25a of indoor unit 20a, and operation commands for operating outdoor unit 10b and indoor unit 20b are output to controller 15b of outdoor unit 10b and controller 25b of indoor unit 20b.

Next, system control device 80 receives an output signal of refrigerant sensor 50 via controller 25a of indoor unit 20a and/or controller 25b of indoor unit 20b, and determines, based on the received signal, whether or not refrigerant sensor 50 has detected refrigerant (step S25). When no refrigerant has been detected by refrigerant sensor 50 (NO in step S25), it is determined that no refrigerant leakage has occurred, and the process is returned to step S25.

When it is determined that refrigerant sensor 50 has detected refrigerant in step S25 (YES in step S25), system control device 80 determines whether or not a ventilator is installed in the target space in which refrigerant sensor 50 having detected the refrigerant is installed (step S30). When it is determined that a ventilator is installed (YES in step S30), system control device 80 outputs an operation command to the ventilator (step S35). On the other hand, when it is determined that no ventilator is installed (NO in step S30), system control device 80 proceeds the process to a step S40 without performing step S35. In this first embodiment, since ventilator 60 is installed in target space 40 having refrigerant sensor 50 installed therein, YES is selected in step S30 and system control device 80 outputs the operation command to ventilator 60.

Then, system control device 80 performs a process for notifying the occurrence of the refrigerant leakage in target space 40 (step S40). The notification can be provided by means of the displaying on display device 86 as in step S15; however, in addition to or instead of the displaying on display device 86, an audio output or the like can be employed.

It should be noted that the process of step S40 in which the process is performed for notifying the occurrence of the refrigerant leakage in target space 40 may be performed immediately after determining in step S25 that refrigerant sensor 50 has detected the refrigerant.

Next, system control device 80 performs a refrigerant leakage specifying process for specifying an indoor unit in which the refrigerant leakage has occurred in target space 40 (step S45). By this refrigerant leakage specifying process, it is specified in which one of indoor units 20a, 20b installed in target space 40 the refrigerant leakage has occurred. Details of the refrigerant leakage specifying process will be described in detail later with reference to FIG. 5.

When the indoor unit in which the refrigerant leakage has occurred is specified in step S45, system control device 80 makes reference to the grouping information (FIG. 3) stored in storage device 84, and outputs an operation command to the refrigerant leakage suppression device corresponding to the indoor unit in which the refrigerant leakage has been specified (step S50). That is, when refrigerant leakage in indoor unit 20a is specified, an operation command (close command) is output to shutoff valve 70a serving as the refrigerant leakage suppression device corresponding to indoor unit 20a, whereas when refrigerant leakage in indoor unit 20b is specified, an operation command (close command) is output to shutoff valve 70b serving as the refrigerant leakage suppression device corresponding to indoor unit 20b.

Further, system control device 80 continues the operations of the indoor and outdoor units that are not affected by the operation of the refrigerant leakage suppression device in step S50. In this first embodiment, for example, even when the refrigerant leakage of indoor unit 20a is specified and shutoff valve 70a is closed, indoor unit 20b and outdoor unit 10b are not affected. Hence, indoor unit 20a is supplied with an operation stopping command and is therefore made nonoperational, whereas the operations of outdoor unit 10b and indoor unit 20b are continued.

Then, system control device 80 performs a process for notifying the following contents (step S60). That is, system control device 80 performs a process for notifying: such a fact that the refrigerant leakage suppression device (shutoff valve 70a in the above-described example) corresponding to the indoor unit in which the refrigerant leakage has been specified is being operated; whether or not the other indoor unit(s) are affected (indoor unit 20b is not affected in the above-described example); a measure that can be taken by the user (opening a window of the room (target space 40), moving out of the room, or the like); and the like. The notification can be provided by means of the displaying on display device 86 as in step S15 or step S40; however, in addition to or instead of the displaying on display device 86, an audio output or the like can be employed.

Next, system control device 80 determines whether or not the measure taken against refrigerant leakage by the refrigerant leakage suppression device having been started to be operated in step S50 has been completed (step S65). For example, in the following cases, it may be determined that the measure against refrigerant leakage has been completed: a case where a certain time has passed after outputting the operation command to the refrigerant leakage suppression device in step S50; a case where refrigerant gas concentration detected by refrigerant sensor 50 is sufficiently decreased; and the like. It should be noted that in this first embodiment, shutoff valves 70a, 70b are employed as the means of the measure against refrigerant leakage, and the measure against refrigerant leakage is immediately completed by outputting the operation command and confirming the operation. Hence, by confirming the operation (confirming the close operation) of the shutoff valve for which the operation command has been output, it may be determined that the measure against refrigerant leakage has been completed.

When it is determined that the measure against refrigerant leakage has been completed (YES in step S65), system control device 80 performs a process for notifying the completion of the measure against refrigerant leakage (step S70). The notification can be provided by means of the displaying on display device 86 as in step S15 and the like; however, in addition to or instead of the displaying on display device 86, an audio output or the like can be employed.

Figure 5:
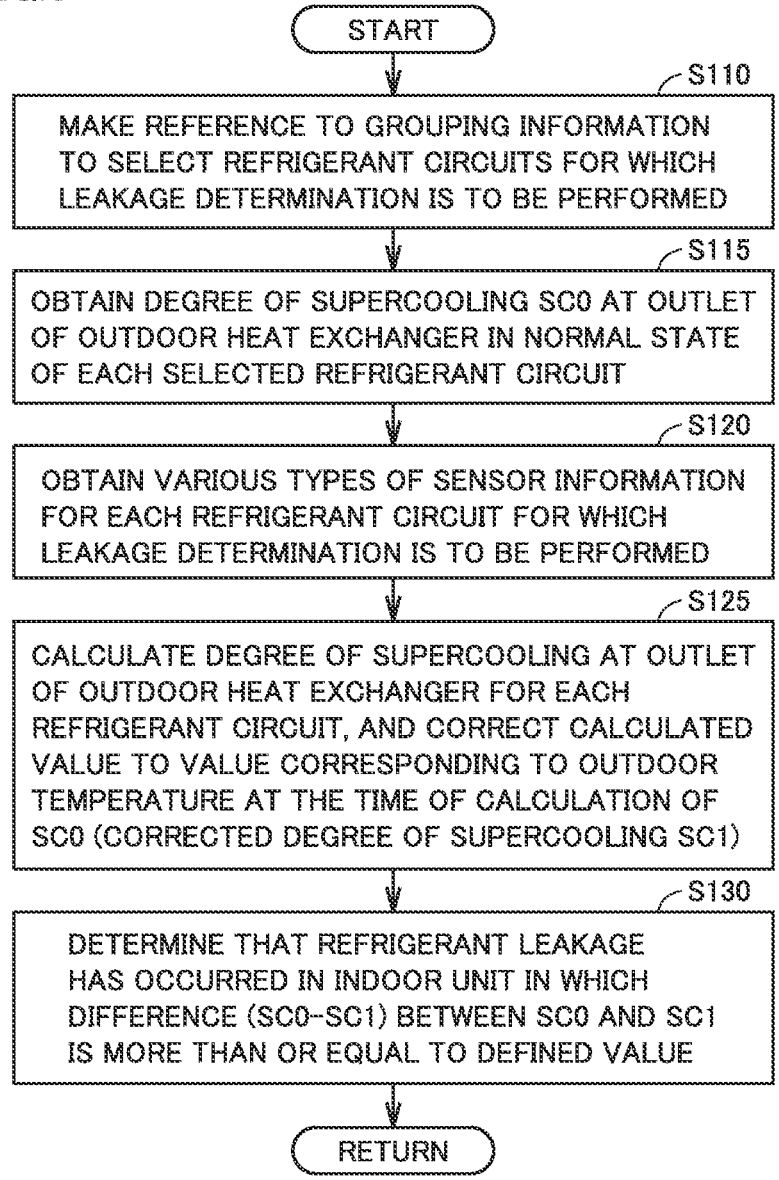
FIG. 5 is a flowchart illustrating an exemplary procedure of a refrigerant leakage specifying process performed in a step S45 of FIG. 4.

FIG. 5 is a flowchart illustrating an exemplary procedure of the refrigerant leakage specifying process performed in step S45 of FIG. 4. With reference to FIG. 5, system control device 80 makes reference to the grouping information (FIG. 3) stored in storage device 84 to select a refrigerant circuit for which the determination (examination) as to refrigerant leakage is to be performed (step S110). In this first embodiment, the refrigerant circuit constituted of outdoor unit 1 and indoor unit 1 (outdoor unit 10a and indoor unit 20a) and the refrigerant circuit constituted of outdoor unit 2 and indoor unit 2 (outdoor unit 10b and indoor unit 20b) are selected to be examined.

In this first embodiment, whether or not refrigerant leakage has occurred is determined for each selected refrigerant circuit based on a degree of supercooling of the refrigerant at an outlet of the outdoor heat exchanger. That is, when the degree of supercooling of the refrigerant is decreased greatly as compared with that in the normal case, it is suspected that the pressure of the refrigerant is decreased in the refrigerant circuit. Hence, it can be determined that refrigerant leakage has occurred.

Here, the following briefly describes a method for calculating the degree of supercooling. With reference to FIG. 2 again, pressure sensor 114 and temperature sensors 116, 118 are provided in outdoor unit 10. Pressure sensor 114 and temperature sensor 116 are provided at the outlet side of outdoor heat exchanger 106 when outdoor heat exchanger 106 functions as a condenser (during the cooling operation). Pressure sensor 114 detects the refrigerant pressure (condensing pressure) at the outlet side of outdoor heat exchanger 106. Temperature sensor 116 detects the refrigerant temperature at the outlet side of outdoor heat exchanger 106. Temperature sensor 118 detects an outdoor air temperature around outdoor heat exchanger 106.

The degree of supercooling of the refrigerant at the outlet side of outdoor heat exchanger 106 can be calculated in the following manner: the refrigerant pressure at the outlet side of outdoor heat exchanger 106 detected by pressure sensor 114 is converted into a saturation temperature value of the refrigerant; and the refrigerant temperature detected by temperature sensor 116 is subtracted from the saturation temperature value.

Moreover, in this first embodiment, when air conditioning apparatus 5 is normal, an examination operation (cooling operation) is performed to calculate a degree of supercooling SC0 in the normal state for each refrigerant circuit. Degree of supercooling SC0 is stored into storage device 84 together with an outdoor air temperature detected by temperature sensor 118 at that time.

With reference to FIG. 5 again, in order to perform the refrigerant leakage determination based on such a degree of supercooling of the refrigerant, system control device 80 obtains, from storage device 84, degree of supercooling SC0 at the outlet of the outdoor heat exchanger in the normal state of each refrigerant circuit selected in step S110, and the outdoor air temperature at the time of the calculation of degree of supercooling SC0 (step S115).

Next, system control device 80 obtains various types of sensor information (each of detection values of pressure sensor 114 and temperature sensor 116 in FIG. 2) for each of the refrigerant circuits for which the leakage determination is to be performed (step S120). Then, system control device 80 calculates a degree of supercooling at present at the outlet side of outdoor heat exchanger 106 based on the obtained various types of sensor information, and corrects the calculated value to a value corresponding to the outdoor temperature at the time of the calculation of degree of supercooling SC0 (the degree of supercooling after the correction is represented by SC1).

Next, system control device 80 calculates a difference (SC0-SC1) between degree of supercooling SC0, obtained in step S115, in the normal state and degree of supercooling SC1 calculated in step S125. System control device 80 determines that the refrigerant leakage has occurred from an indoor unit of a refrigerant circuit for which the calculated difference value is more than or equal to a predetermined defined value (step S130).

As described above, in this first embodiment, when refrigerant leakage is detected by refrigerant sensor 50 installed in target space 40, the process is performed for specifying, from indoor units 20a, 20b installed in target space 40, an indoor unit in which the refrigerant leakage has occurred, and by making reference to the grouping information, a shutoff valve (70a or 70b) corresponding to the indoor unit in which the refrigerant leakage has been specified is operated. Accordingly, for example, when refrigerant leakage from indoor unit 20a is specified, the following measure or the like can be taken: shutoff valve 70a serving as the refrigerant leakage suppression device corresponding to indoor unit 20a is closed and the operation of indoor unit 20b is continued. Therefore, according to this first embodiment, upon occurrence of refrigerant leakage in target space 40, safety can be improved while maintaining comfortableness in target space 40.

Second Embodiment

In the first embodiment, shutoff valves 70a, 70b are provided as the means for suppressing refrigerant leakage when the refrigerant leakage is detected; however, in this second embodiment, as the means for suppressing refrigerant leakage, a refrigerant collection operation (also referred to as "pump down operation") is performed to collect, to the outdoor unit, the refrigerant remaining in the refrigerant pipe and the indoor unit in which the refrigerant leakage has occurred.

Figures 6, 7:
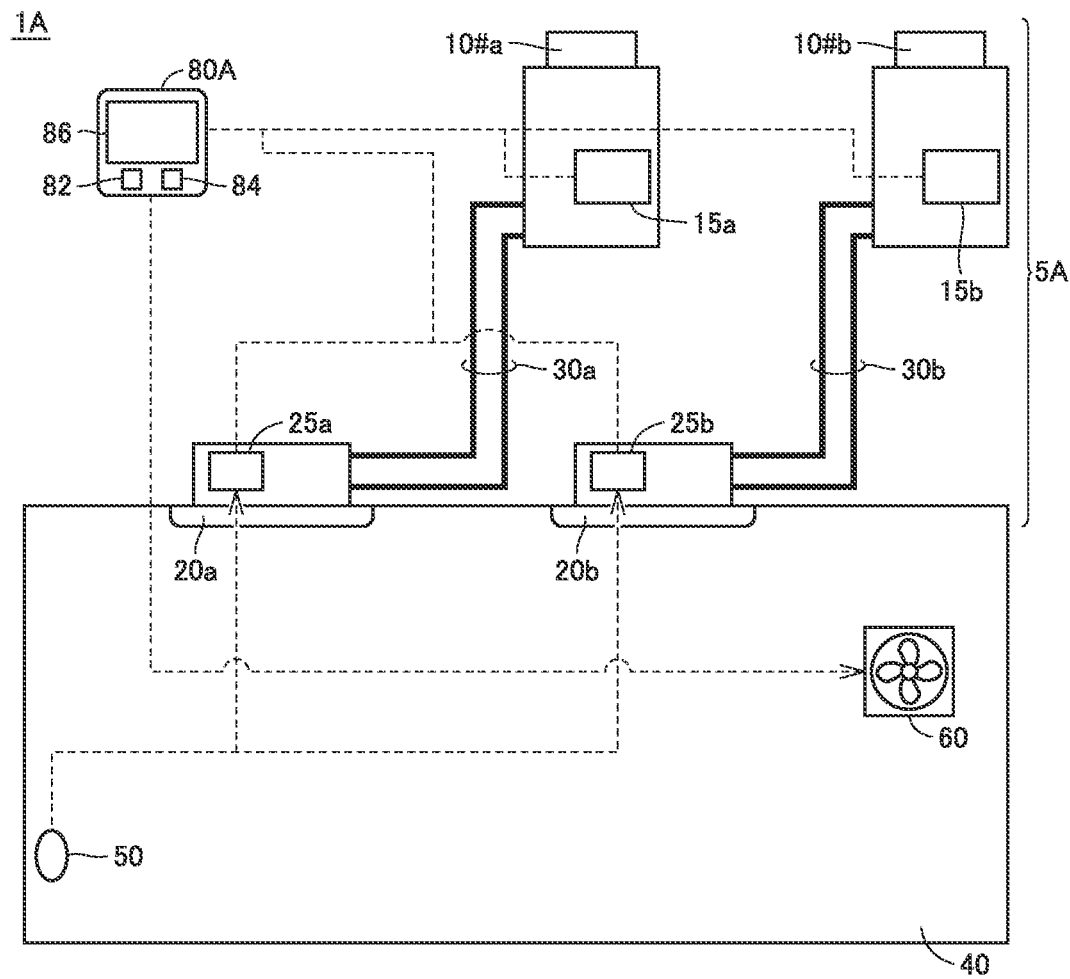
FIG. 6 is an entire configuration diagram of an air conditioning system according to a second embodiment of the present disclosure.
FIG. 7 shows exemplary grouping information for the air conditioning system shown in FIG. 6.

FIG. 6 is an entire configuration diagram of an air conditioning system according to the second embodiment of the present disclosure. With reference to FIG. 6, this air conditioning system 1A includes an air conditioning apparatus 5A instead of air conditioning apparatus 5 in the configuration of air conditioning system 1 shown in FIG. 1. Air conditioning apparatus 5A does not include shutoff valves 70a, 70b in air conditioning apparatus 5 shown in FIG. 1, and includes outdoor units 10#a, 10#b, and a system control device 80A instead of outdoor units 10a, 10b and system control device 80.

Indoor unit 20a is connected to outdoor unit 10#a through refrigerant pipe 30a. Indoor unit 20b is connected to outdoor unit 10#b through refrigerant pipe 30b. A refrigeration cycle apparatus is constituted of outdoor unit 10#a, indoor unit 20a, and refrigerant pipe 30a. A refrigeration cycle apparatus is constituted of outdoor unit 10#b, indoor unit 20b, and refrigerant pipe 30b.

A refrigerant circuit constituted of outdoor unit 10#a, indoor unit 20a, and refrigerant pipe 30a is configured to perform the pump down operation. Also, a refrigerant circuit constituted of outdoor unit 10#b, indoor unit 20b, and refrigerant pipe 30b is configured to perform the pump down operation. Details of the pump down operation will be later described with reference to FIG. 8 and FIG. 9.

As with system control device 80 in the first embodiment, when refrigerant leakage in target space 40 is detected by refrigerant sensor 50, system control device 80A outputs an operation command to ventilator 60, and performs a process for specifying in which one of indoor units 20a, 20b installed in target space 40 the refrigerant leakage has occurred. Then, system control device 80A makes reference to the grouping information to operate a refrigerant leakage suppression device corresponding to the indoor unit in which the refrigerant leakage has been specified. That is, system control device 80A makes reference to the grouping information to perform, as the refrigerant leakage suppression means, the refrigerant collection operation (pump down operation) onto the indoor unit in which the refrigerant leakage has been specified.

FIG. 7 shows exemplary grouping information for air conditioning system 1A shown in FIG. 6. With reference to FIG. 7, also in this second embodiment, a target space 1 corresponding to target space 40 shown in FIG. 6 exists. Target space 1 is associated with a refrigerant sensor 1 corresponding to refrigerant sensor 50 shown in FIG. 6. Moreover, two indoor units 20a, 20b are installed in target space 40. Target space 1 and refrigerant sensor 1 are associated with indoor units 1, 2 respectively corresponding to indoor units 20a, 20b shown in FIG. 6.

In this second embodiment, outdoor units 10#a, 10#b are respectively provided corresponding to indoor units 20a, 20b. Indoor units 1, 2 are associated with outdoor units 1, 2 respectively corresponding to outdoor units 10#a, 10#b shown in FIG. 6. Further, as the refrigerant leakage suppression means corresponding to indoor unit 1, the refrigerant collection, i.e., pump down operation using outdoor unit 10#a is associated. As the refrigerant leakage suppression means corresponding to indoor unit 2, the refrigerant collection, i.e., pump down operation using outdoor unit 10#b is associated.

Figure 8:
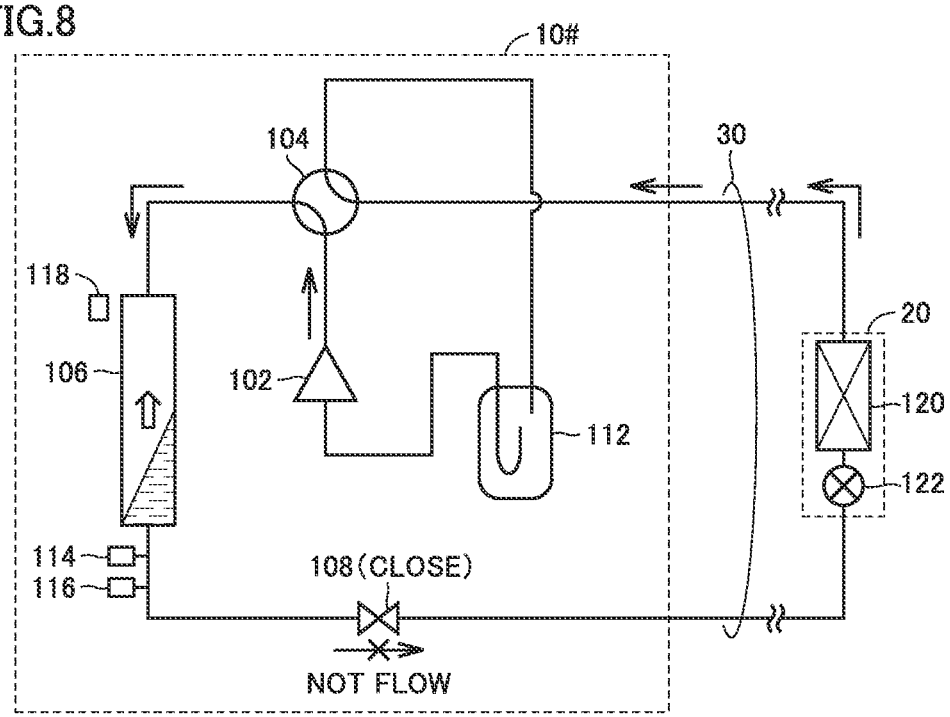
FIG. 8 illustrates a first mode operation during a pump down operation.

FIG. 8 illustrates a first mode operation during the pump down operation. With reference to FIG. 8, outdoor unit 10# (10#a, 10#b) in the second embodiment further includes a shutoff valve 108 in outdoor unit 10 in the first embodiment. Shutoff valve 108 is provided at a refrigerant pipe between outdoor heat exchanger 106 and expansion valve 122. Shutoff valve 108 is controlled to be in the close state during the pump down operation.

In the first mode operation, compressor 102 is operated with expansion valve 122 being in a full open state and four-way valve 104 being set to the cooling operation state (state A). Accordingly, the refrigerant in indoor heat exchanger 120 and refrigerant pipe 30 is sent by compressor 102 to outdoor heat exchanger 106 via four-way valve 104 and accumulator 112, and is condensed in outdoor heat exchanger 106. Since shutoff valve 108 is closed, the refrigerant condensed by outdoor heat exchanger 106 is stored in outdoor heat exchanger 106.

Figure 9:
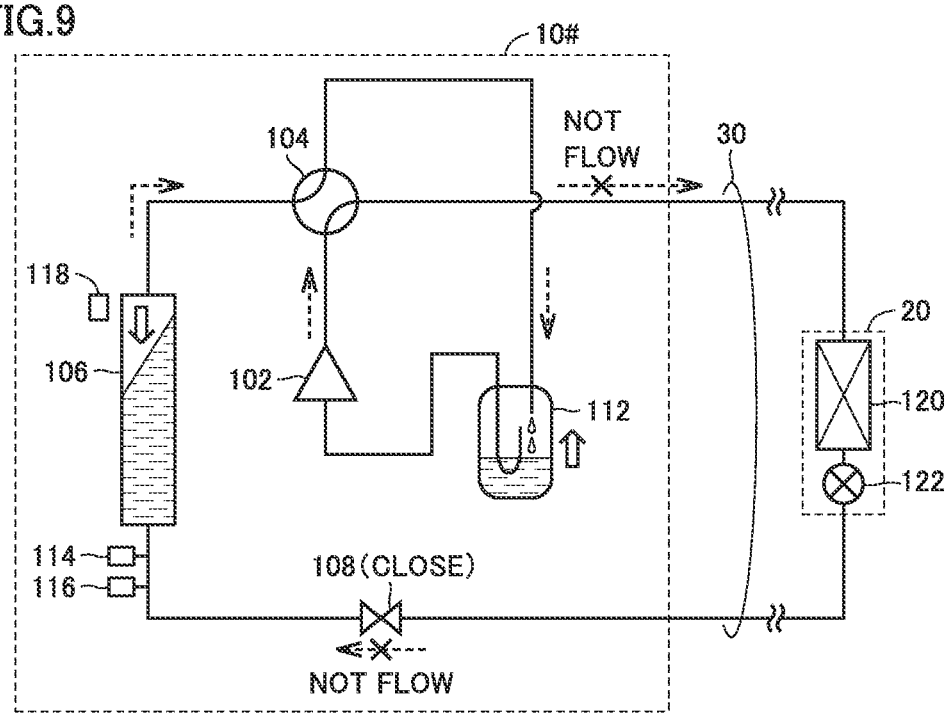
FIG. 9 illustrates a second mode operation during the pump down operation.

FIG. 9 illustrates a second mode operation during the pump down operation. With reference to FIG. 9, the second mode operation is performed after the first mode operation.

Also during the second mode operation, shutoff valve 108 is controlled to be in the close state. In the second mode operation, compressor 102 is operated with four-way valve 104 being set to the heating operation state (state B). Accordingly, the liquid refrigerant stored in outdoor heat exchanger 106 is sent to accumulator 112 via four-way valve 104, and is collected to accumulator 112. With this operation, a volume for storing the refrigerant can be increased.

Thus, by the pump down operation constituted of the first mode operation and the subsequent second mode operation, the refrigerant in indoor unit 20 and refrigerant pipe 30 can be collected to accumulator 112 of outdoor unit 10.

A flow of a series of processes performed by system control device 80A in this second embodiment is also basically the same as the flow of the processes shown in the flowcharts shown in FIG. 4 and FIG. 5. With reference to FIG. 4, the following describes a procedure of the processes performed by system control device 80A in this second embodiment.

With reference to FIG. 4 again, system control device 80A determines whether or not each of the refrigerant leakage suppression devices is normal (step S10). In this second embodiment, it is determined whether or not each of the various types of devices including shutoff valve 108 is normal. For example, when an abnormality in communication with shutoff valve 108 or the like is detected, system control device 80A determines that the refrigerant leakage suppression device is not normal (abnormal).

The processes of step S15 to step S45 are the same as those in system control device 80 in the first embodiment. It should be noted that also in this second embodiment, the process of step S40 in which the process is performed for notifying the occurrence of the refrigerant leakage in target space 40 may be performed immediately after determining in step S25 that refrigerant sensor 50 has detected the refrigerant.

When the indoor unit in which the refrigerant leakage has occurred is specified in step S45, system control device 80A makes reference to the grouping information (FIG. 7) stored in storage device 84, and outputs an operation command to the refrigerant leakage suppression device corresponding to the indoor unit in which the refrigerant leakage has been specified (step S50). That is, when refrigerant leakage in indoor unit 20a is specified, a command is output to each of controllers 15a, 25a to perform the pump down operation for indoor unit 20a and outdoor unit 10#a, whereas when refrigerant leakage in indoor unit 20b is specified, a command is output to each of controllers 15b, 25b to perform the pump down operation for indoor unit 20b and outdoor unit 10#b.

In this second embodiment, for example, when the refrigerant leakage in indoor unit 20a is specified and the pump down operation for indoor unit 20a and outdoor unit 10#a is performed, the air conditioning operations of outdoor unit 10#b and indoor unit 20b are continued because indoor unit 20b and outdoor unit 10#b are not affected.

Further, after performing step S60, system control device 80A determines whether or not the measure taken against refrigerant leakage by the refrigerant leakage suppression device having been started to be operated in step S50 has been completed (step S65). In this second embodiment, the pump down operation is employed as the means of the measure against refrigerant leakage. In this step S65, it is determined whether or not the refrigerant collection by the pump down operation has been completed. The completion of the refrigerant collection can be determined in accordance with: a time elapsed from the start of the pump down operation; a sufficient decrease in refrigerant gas concentration detected by refrigerant sensor 50; an amount of liquid refrigerant in accumulator 112; or the like.

When it is determined that the pump down operation as the measure against refrigerant leakage has been completed (YES in step S65), system control device 80A performs a process for notifying the completion of the measure against refrigerant leakage (step S70).

As described above, also according to this second embodiment, upon occurrence of refrigerant leakage in target space 40, safety can be improved while maintaining comfortableness in target space 40.

Third Embodiment

Figure 10:
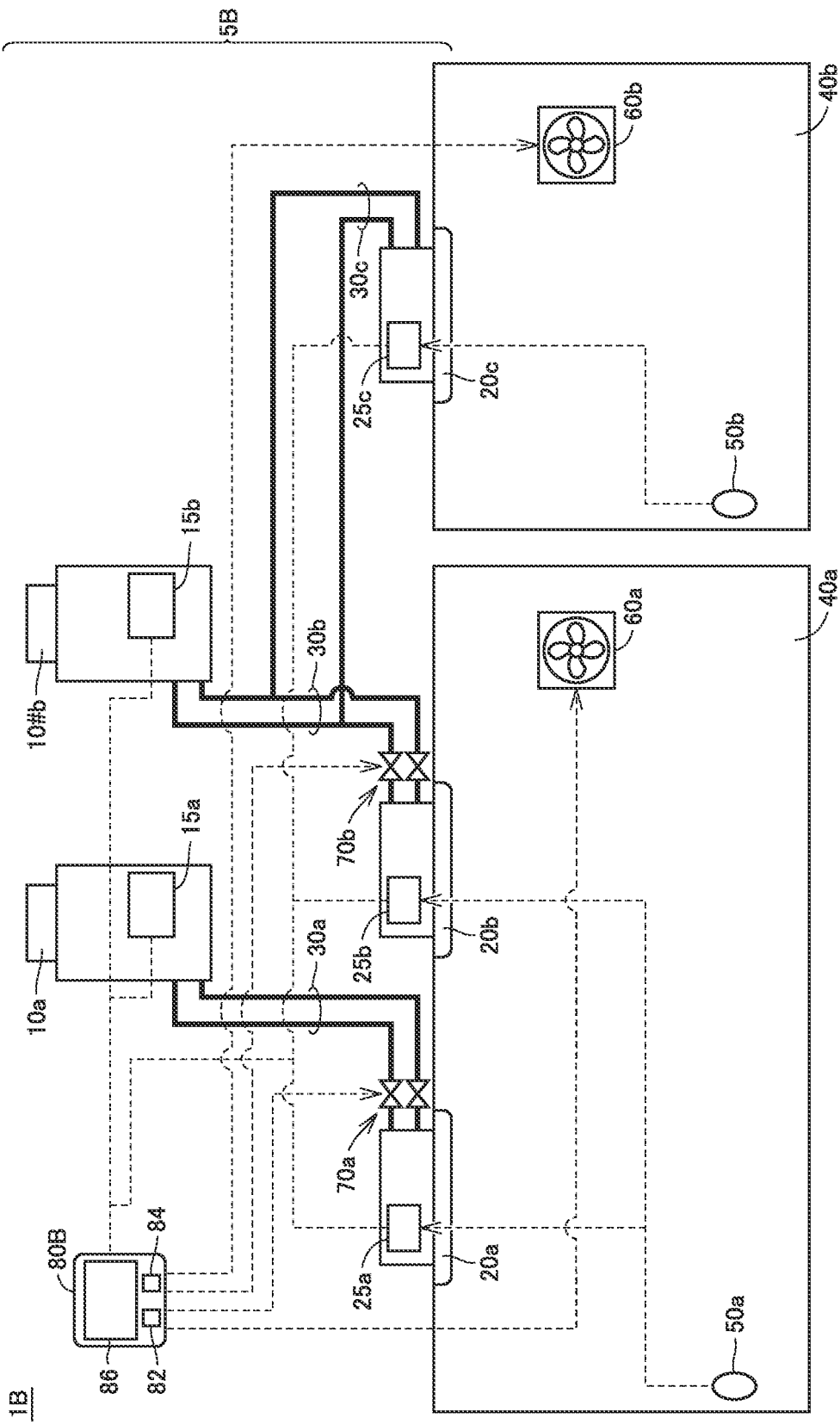
FIG. 10 is an entire configuration diagram of an air conditioning system according to a third embodiment.

In a third embodiment, an example involving a plurality of target spaces will be illustrated. FIG. 10 is an entire configuration diagram of an air conditioning system according to the third embodiment. With reference to FIG. 10, an air conditioning system 1B includes: an air conditioning apparatus 5B configured to perform cooling or heating of target spaces 40a, 40b; a refrigerant sensor 50a and a ventilator 60a each installed in target space 40a; a refrigerant sensor 50b and a ventilator 60b each installed in target space 40b; and a system control device 80B.

Air conditioning apparatus 5B includes outdoor units 10a, 10#b, indoor units 20a, 20b, 20c, refrigerant pipes 30a, 30b, 30c, and shutoff valves 70a, 70b. Indoor unit 20b is connected to outdoor unit 10#b through refrigerant pipe 30b. Indoor unit 20c is connected to outdoor unit 10#b through refrigerant pipe 30c. A refrigeration cycle apparatus is constituted of outdoor unit 10#b, indoor units 20b, 20c, and refrigerant pipes 30b, 30c. The configuration in this third embodiment is such that air conditioning apparatus 5 of the first embodiment shown in FIG. 1 further includes indoor unit 20c installed in target space 40b and refrigerant pipe 30c for connecting indoor unit 20c to refrigerant pipe 30b, and includes outdoor unit 10#b instead of outdoor unit 10b.

When refrigerant leakage in target space 40a is detected by refrigerant sensor 50a, system control device 80B outputs an operation command to ventilator 60a, and performs a process for specifying in which one of indoor units 20a, 20b installed in target space 40a the refrigerant leakage has occurred.

Moreover, when refrigerant leakage in target space 40b is detected by refrigerant sensor 50b, system control device 80B outputs an operation command to ventilator 60b, and performs a process for specifying an indoor unit in which the refrigerant leakage has occurred. It should be noted that since only indoor unit 20c is installed in target space 40b, when refrigerant leakage is detected by refrigerant sensor 50b, it can be specified immediately that the indoor unit in which the refrigerant leakage has occurred is indoor unit 20c.

Then, system control device 80B makes reference to the grouping information to operate a refrigerant leakage suppression device corresponding to the indoor unit in which the refrigerant leakage has been specified.

Figures 11, 12:
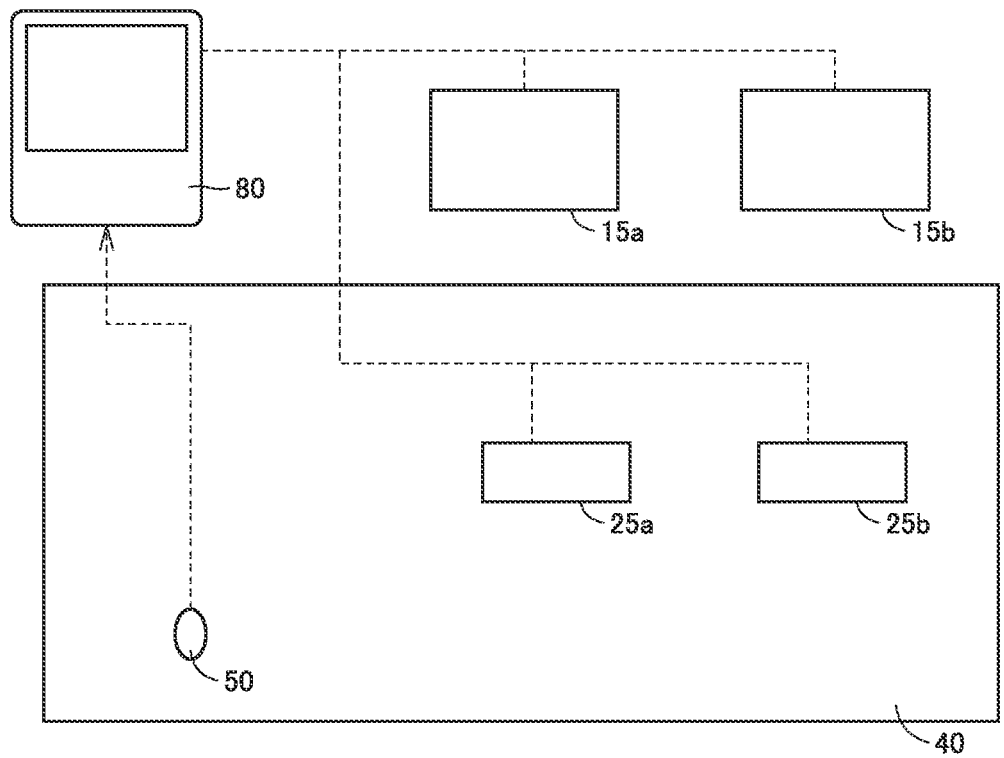
FIG. 11 shows exemplary grouping information for the air conditioning system shown in FIG. 10.
FIG. 12 shows another exemplary configuration of the air conditioning system.

FIG. 11 shows exemplary grouping information for air conditioning system 1B shown in FIG. 10. With reference to FIG. 11, in this third embodiment, target spaces 1, 2 corresponding to target spaces 40a, 40b shown in FIG. 10 exist. Target space 1 is associated with refrigerant sensor 1 corresponding to refrigerant sensor 50a shown in FIG. 10. Target space 2 is associated with refrigerant sensor 2 corresponding to refrigerant sensor 50b.

Moreover, two indoor units 20a, 20b are installed in target space 40a. Target space 1 and refrigerant sensor 1 are associated with indoor units 1, 2 respectively corresponding to indoor units 20a, 20b shown in FIG. 10. On the other hand, indoor unit 20c is installed in target space 40b. Target space 2 and refrigerant sensor 2 are associated with indoor unit 3 corresponding to indoor unit 20c shown in FIG. 10.

Further, in this third embodiment, outdoor units 10a, 10#b are respectively provided corresponding to indoor units 20a, 20b. Indoor units 1, 2 are associated with outdoor units 1, 2 respectively corresponding to outdoor units 10a, 10#b shown in FIG. 10. Moreover, indoor unit 20c is connected to refrigerant pipe 30b via refrigerant pipe 30c. A refrigeration cycle apparatus is constituted of indoor unit 20c and outdoor unit 10#b. That is, outdoor unit 2 corresponding to outdoor unit 10#b shown in FIG. 10 is associated with indoor unit 3.

Further, as the refrigerant leakage suppression means corresponding to indoor unit 1, refrigerant circuit shutoff by shutoff valve 70a is associated. As the refrigerant leakage suppression means corresponding to indoor unit 2, refrigerant circuit shutoff by shutoff valve 70b is associated. As the refrigerant leakage suppression means corresponding to indoor unit 3, the refrigerant collection, i.e., pump down operation using outdoor unit 10#b is associated.

A flow of a series of processes performed by system control device 80B in this third embodiment is also basically the same as the flow of the processes shown in the flowcharts shown in FIG. 4 and FIG. 5. With reference to FIG. 4, the following describes a procedure of the processes performed by system control device 80B in this third embodiment.

With reference to FIG. 4 again, system control device 80B also first determines whether or not each of the refrigerant leakage suppression devices is normal (step S10). In this third embodiment, it is determined whether or not each of shutoff valves 70a, 70b is normal and whether or not each of the various types of devices including shutoff valve 108 is normal.

The following describes a case where refrigerant is detected by refrigerant sensor 50a in step S25. When it is determined that refrigerant sensor 50a has detected refrigerant (YES in step S25), system control device 80B determines whether or not a ventilator is installed in target space 40a in which refrigerant sensor 50a having detected the refrigerant is installed (step S30). In this third embodiment, since ventilator 60a is installed in target space 40a having refrigerant sensor 50a installed therein, YES is selected in step S30 and system control device 80B outputs an operation command to ventilator 60a (step S35).

Then, system control device 80B performs a process for notifying the occurrence of the refrigerant leakage in target space 40a (step S40). It should be noted that also in this third embodiment, the process of step S40 in which the process is performed for notifying the occurrence of the refrigerant leakage in target space 40 may be performed immediately after determining in step S25 that refrigerant sensor 50 has detected the refrigerant.

Next, system control device 80B performs a refrigerant leakage specifying process for specifying an indoor unit in which the refrigerant leakage has occurred in target space 40a (step S45). For example, when the refrigerant leakage in indoor unit 20b is specified, system control device 80B makes reference to the grouping information (FIG. 11) stored in storage device 84, and outputs an operation command (close command) to shutoff valve 70b serving as the refrigerant leakage suppression device corresponding to indoor unit 20b in which the refrigerant leakage has been specified (step S50).

Further, system control device 80B continues the operations of the indoor and outdoor units that are not affected by the operation of the refrigerant leakage suppression device in step S50. For example, even when the refrigerant leakage in indoor unit 20b is specified and shutoff valve 70b is closed, the refrigerant circuit constituted of indoor unit 20a and outdoor unit 10a and the refrigerant circuit constituted of indoor unit 20c and outdoor unit 10#b are not affected. Therefore, when indoor unit 20a is being operated, the operations of outdoor unit 10a and indoor unit 20a are continued. When indoor unit 20c is being operated, the operations of outdoor unit 10#b and indoor unit 20c are continued.

In step S60, system control device 80B performs a process for notifying: such a fact that shutoff valve 70b serving as the refrigerant leakage suppression device corresponding to indoor unit 20b in which the refrigerant leakage has been specified is being operated (closed); whether or not the other indoor unit(s) are affected (indoor units 20a, 20c are not affected in the above-described example); a measure that can be taken by the user (opening a window of the room (target space 40a) or the like); and the like.

Then, when it is determined that the measure (closure of shutoff valve 70b) against refrigerant leakage has been completed (YES in step S65), system control device 80B performs a process for notifying the completion of the measure against refrigerant leakage (step S70).

The following describes a case where refrigerant is detected by refrigerant sensor 50b in step S25. When it is determined that refrigerant sensor 50b has detected refrigerant (YES in step S25), system control device 80B determines whether or not a ventilator is installed in target space 40b in which refrigerant sensor 50b having detected the refrigerant is installed (step S30). In this third embodiment, since ventilator 60b is installed in target space 40b having refrigerant sensor 50b installed therein, YES is selected in step S30 and system control device 80B outputs an operation command to ventilator 60b (step S35).

Then, system control device 80B performs a process for notifying the occurrence of the refrigerant leakage in target space 40b (step S40). Next, system control device 80B performs a refrigerant leakage specifying process for specifying an indoor unit in which the refrigerant leakage has occurred in target space 40b (step S45). It should be noted that in this third embodiment, since only indoor unit 20c is installed in target space 40b, when refrigerant leakage is detected by refrigerant sensor 50b, it is specified immediately that the indoor unit in which the refrigerant leakage has occurred is indoor unit 20c.

Then, system control device 80B makes reference to the grouping information (FIG. 11) stored in storage device 84, and outputs an operation command to the refrigerant leakage suppression device corresponding to indoor unit 20c in which the refrigerant leakage has been specified (step S50). That is, a command is output to each of controllers 15b, 25c to perform the pump down operation for indoor unit 20c and outdoor unit 10#b.

Further, system control device 80B continues the operations of the indoor and outdoor units that are not affected by the operation of the refrigerant leakage suppression device in step S50. When the refrigerant leakage of indoor unit 20c is specified and the above-described pump down operation is performed, indoor unit 20b is instructed to be nonoperational because the operation of indoor unit 20b connected to outdoor unit 10#b to which indoor unit 20c is also connected cannot be continued. On the other hand, even when the above-described pump down operation is performed, the refrigerant circuit constituted of indoor unit 20a and outdoor unit 10a is not affected. Therefore, when indoor unit 20a is being operated, the operations of outdoor unit 10a and indoor unit 20a are continued.

In step S60, system control device 80B performs a process for notifying: such a fact that the pump down operation is being performed for indoor unit 20c in which the refrigerant leakage has been specified; whether or not the other indoor unit(s) are affected (indoor unit 20a is not affected and indoor units 20b is affected in the above-described example); a measure that can be taken by the user (opening a window of the room (target space 40b), moving out of the room, or the like); and the like.

Then, when it is determined that the measure (the pump down operation for indoor unit 20c) against refrigerant leakage has been completed (YES in step S65), system control device 80B performs a process for notifying the completion of the measure against refrigerant leakage (step S70).

As described above, according to this third embodiment, upon occurrence of refrigerant leakage in target space 40a or 40b, safety can be improved while maintaining comfortableness in target space 40a or 40b.

Modification.

In each of the first and second embodiments, the output signal of refrigerant sensor 50 is sent to system control device 80, 80A via controller 25a of indoor unit 20a and/or controller 25b of indoor unit 20b; however, the output signal of refrigerant sensor 50 may be directly sent to system control device 80, 80A not via controller 25a, 25b as shown in FIG. 12. Moreover, although not shown in the figures particularly, the detection values of refrigerant sensors 50a, 50b in the third embodiment may be directly sent to system control device 80B not via the controllers of the indoor units.

Figure 13:
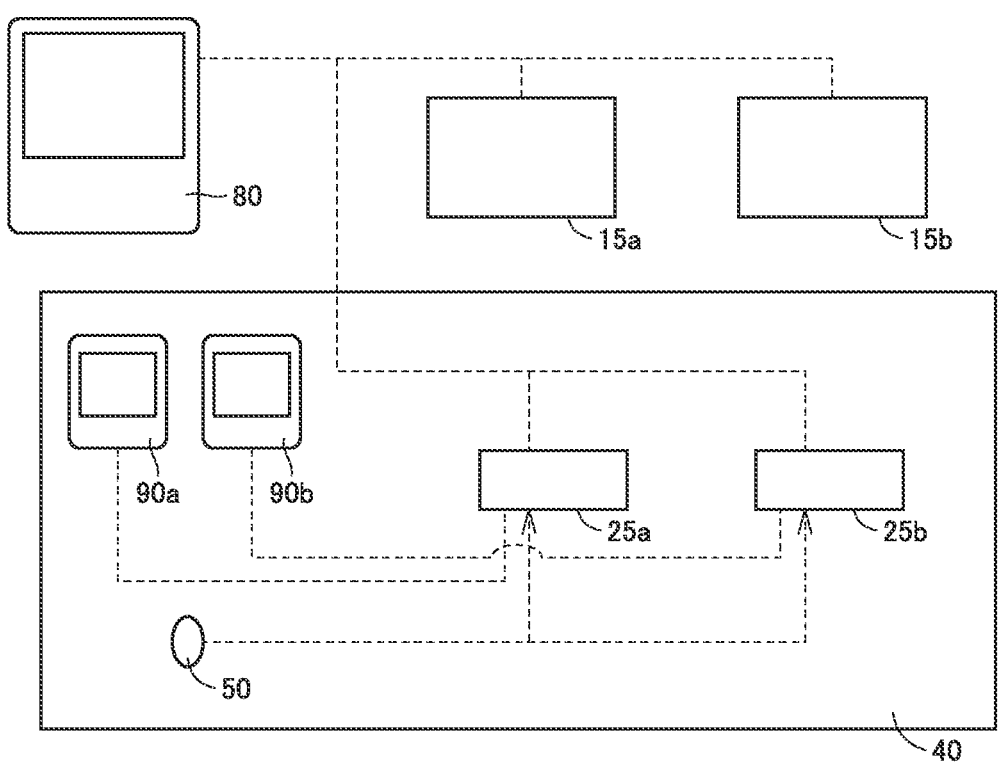
FIG. 13 shows still another exemplary configuration of the air conditioning system.

Moreover, as shown in FIG. 13, an indoor unit remote control for each indoor unit may be provided (such as indoor unit remote controls 90a, 90b respectively connected to controllers 25a, 25b of indoor units 20a, 20b). In this case, for example, in the indoor unit for which the refrigerant leakage suppression device has been operated, a notification unit (such as a display unit) of a corresponding indoor unit remote control may provide a notification (displaying).

Moreover, the grouping information may be retained in an indoor unit remote control or a controller of an indoor unit. In this case, a DIP switch may be provided on a microcomputer substrate of the controller of the indoor unit, a number is assigned for each indoor unit and each refrigerant sensor, and the number may be managed by system control device 80 (80A, 80B).

Further, the grouping information may be able to be set by the user via system control device 80 (80A, 80B) or the like, for example. For example, in air conditioning system 1B shown in FIG. 10, it is useful to allow the user to set the grouping information in the following case or the like: target spaces 40a, 40b are partitioned by a movable wall, and by moving the movable wall, the target spaces can be partitioned into a target space including only indoor unit 20a and a target space including indoor units 20b, 20c.

Moreover, although not shown in the figures particularly, three or more target spaces may be provided and three or more indoor units may be installed in each target space. Moreover, a plurality of refrigerant sensors may be provided in each target space.

It is expected to appropriately combine the embodiments disclosed herein for implementation unless technically contradicted. The embodiments disclosed herein are illustrative and non-restrictive in any respect. The scope of the present disclosure is defined by the terms of the claims, rather than the embodiments described above, and is intended to include any modifications within the scope and meaning equivalent to the terms of the claims.

REFERENCE SIGNS LIST 1, 1A, 1B: air conditioning system; 5, 5A, 5B: air conditioning apparatus; 10, 10a, 10b, 10#, 10#a, 10#b: outdoor unit; 15a, 15b, 25a, 25b: controller; 20, 20a to 20c: indoor unit; 30, 30a to 30c: refrigerant pipe; 40, 40a, 40b: target space; 50, 50a, 50b: refrigerant sensor; 60, 60a, 60b: ventilator; 70a, 70b, 108: shutoff valve; 80, 80A, 80B: system control device; 82: CPU; 84: storage device; 86: display device; 90a, 90b: indoor unit remote control; 102: compressor; 104: four-way valve; 106: outdoor heat exchanger; 112: accumulator; 114: pressure sensor; 116, 118: temperature sensor; 120: indoor heat exchanger; 122: expansion valve.

The invention claimed is:

1. An air conditioning system comprising:
an air conditioning apparatus configured to perform cooling or heating of a target space by circulating refrigerant; and
a refrigerant leakage detector installed in the target space, the refrigerant leakage detector being configured to detect refrigerant leakage from the air conditioning apparatus to the target space,
the air conditioning apparatus including
a plurality of indoor units, and
at least one outdoor unit,
the air conditioning system further comprising a plurality of refrigerant leakage suppressors, each of the plurality of refrigerant leakage suppressors corresponding to one of the plurality of indoor units, each of the plurality of refrigerant leakage suppressors being configured to suppress the refrigerant leakage from a corresponding indoor unit in response to receiving a refrigerant leakage signal indicating a refrigerant leakage from the corresponding indoor unit,
wherein
each of the plurality of indoor units is associated with the refrigerant leakage detector, and
the air conditioning system is further configured such that the refrigerant leakage signal is provided to a specified indoor unit selected from the plurality of indoor units based on a process for specifying an indoor unit in which the refrigerant leakage has occurred when the refrigerant leakage is detected by the refrigerant leakage detector, such that a refrigerant leakage suppressor included in the plurality of refrigerant leakage suppressors and corresponding to the specified indoor unit is operated, and
the air conditioning system is further configured such that the process for specifying the indoor unit in which the refrigerant leakage has occurred is different than only detecting the refrigerant leakage by the refrigerant leakage detector.

2. The air conditioning system according to claim 1, wherein the refrigerant leakage suppressor corresponding to the specified indoor unit is operated in accordance with grouping information that defines an association among the refrigerant leakage detector, the plurality of indoor units, the at least one outdoor unit, and the plurality of refrigerant leakage suppressors.

3. The air conditioning system according to claim 1, wherein the indoor units are configured such that the indoor units other than the specified indoor unit continue performing any air conditioning operation that was being performed before the refrigerant leakage is detected by the refrigerant leakage detector in a situation in which the refrigerant leakage suppressor corresponding to the specified indoor unit suppresses the refrigerant leakage in response to receiving the refrigerant leakage signal.

4. The air conditioning system according to claim 1, further comprising a ventilator configured to forcedly ventilate the target space, wherein
when the refrigerant leakage is detected by the refrigerant leakage detector, the process is performed and the ventilator is operated.

5. The air conditioning system according to claim 1, wherein each of the plurality of refrigerant leakage suppressors includes one of a shutoff valve provided for the corresponding indoor unit and a refrigerant collector configured to perform a refrigerant collection operation for collecting the refrigerant in the corresponding indoor unit to the outdoor unit.

6. The air conditioning system according to claim 1, further comprising a notifier configured to notify a detection result of the refrigerant leakage detector and operation states of the plurality of refrigerant leakage suppressors.

7. The air conditioning system according to claim 1, wherein the air conditioning system is further configured such that the process (i) calculates a degree of supercooling of the refrigerant at an outlet of the outdoor unit corresponding to a target indoor unit selected from the plurality of indoor units, and (ii) specifies, based on an amount of decrease of the calculated degree of supercooling from a degree of supercooling in a normal state, the specified indoor unit in which the refrigerant leakage has occurred, the degree of supercooling in the normal state being prepared in advance.

8. The air conditioning system according to claim 1, wherein the refrigerant leakage detector is the only refrigerant leakage detector provided in the space.

* * * * *